Patented Aug. 25, 1936

2,052,221

UNITED STATES PATENT OFFICE 2,052,221

METHOD OF PREPARING FRESH MEAT

William J. Dubil, Los Angeles, Calif., assignor of one-half to Edward J. Hubik, South Gate, Calif.

No Drawing. Application September 13, 1935, Serial No. 40,416

6 Claims. (Cl. 99—194)

My invention relates to a method of preparing meat for the trade, and more particularly to a method of preparing very thin slices of fresh meat.

If fresh meat is within the temperature range at which it is usually kept in a butcher shop for retail trade, it is too soft to be sliced very thin with the automatic meat slicer ordinarily used in butcher shops. The result is that the slicer tears the fibers apart instead of slicing through them, and hence does not function properly on fresh meat, if very thin slices are desired.

If the meat is frozen solid, it has been found too hard to be sliced in a slicer of the character mentioned.

An object of my invention is to prepare fresh meat whereby it may be sliced in one of said ordinary, automatic slicers, and by such means produce very thin slices of fresh meat.

Another object of the invention is to provide a method for taking tough, cheap cuts of fresh meat and slicing it very thin to render it tender and appetizing, and thus saleable at a higher price.

Still another object is to provide a loaf of fresh meat, ready sliced in very thin slices, which have been frozen together in a loaf shaped in section to simulate T-bone, rib, porterhouse steaks, or the like.

Further objects will appear in the course of the following description.

Referring more in detail to my invention, the first step in my method is to take either (a) a single piece of boneless, fresh meat the desired size, or (b) smaller, odd-sized pieces of boneless, fresh meat, which pieces are compressed into a loaf. If the second step is followed, the smaller pieces may all be of the same variety of meat, or they may be different varieties; to wit, pieces of pork, beef, lamb and/or veal compressed together.

It is important that the meat be boneless since the ordinary butcher shop is not equipped with slicers capable of cutting through bone and at the same time automatically slice very thin slices.

Irrespective of whether step (a) or (b) is the first step, the single piece of meat or the compressed loaf of smaller pieces is then frozen.

The meat is frozen sufficiently for it to have rigidity to resist tearing of its fibers, but softness enough to permit it to be sliced on one of said ordinary slicers. To produce this particular result, the meat should be from 30° to 32° (all temperatures mentioned herein are Fahrenheit), and approximately the same temperature throughout the mass. The range of 30° to 32° is to take care of meat having different proportions of fat. For lean meat, approximately 32° throughout has been found satisfactory. For meat containing considerable fat, approximately 30° throughout has been found satisfactory. The range between these two temperatures is for successive proportions of fat to lean.

Subjecting the meat to these temperatures for a week's time or more would chill the meat throughout to the desired consistency for slicing. However, to cut down the time for preparation, I freeze the meat solid first and then thaw out to said desired temperatures.

Satisfactory results have been produced by subjecting the meat to temperatures of 18° to 25° for 48 hours, the temperature again depending upon the fatty content of the meat. However, lower temperatures may be used for correspondingly shorter periods, if desired, the function of this step being to freeze the meat solid.

The next step is to remove the solidity from the meat by partially thawing. I have found that meat kept from 18° to 25° for 48 hours may be brought to the desired consistency by subjecting it to approximately 30° to 32° overnight (e. g., 12 hours), depending again on the fatty content of the meat.

The single piece of fresh meat or loaf of fresh meat is now the proper consistency to be sliced very thin by an ordinary automatic slicing machine commonly used in butcher shops. The thickness is known as a "No. 2" slice by those skilled in the trade, and is about the thinness of what is known in the trade as "chipped beef."

The slicing operation is preferably done at a freezing temperature (32°) or less, in order that the thin slices may not thaw out further and lose their natural juices.

In practice these slices are stacked up, and four to six of these thin slices are used as a single steak. They may now be sold and used, or such steaks may be wrapped around and/or pierced by a skewer, and sold and used.

However, it is preferred to compress the slices into a loaf while at said freezing temperature. The loaf may be the shape of T-bone, rib or porterhouse steaks, or may be the shape of buns, etc. The loaf is then frozen again, and is now ready for sale. Restaurants especially like meat in this form, for they may keep the loaves in their cooler and slice them down as needed.

It is to be understood that changes may be made in the details of the invention described above, without departing from the spirit and scope of the invention.

Having thus described my invention, what I claim and desire to secure by Letters Patent is:

1. The method of preparing fresh meat, comprising first freezing the meat solid throughout, then thawing the meat to approximately 30° to 32° F. throughout, and then slicing same into very thin slices.

2. The method of preparing fresh meat, comprising first freezing the meat solid, then thawing the meat to approximately 30° to 32° F. throughout, and then slicing same into very thin slices at a freezing temperature.

3. The method of preparing fresh meat, comprising first freezing the meat solid, then thawing the meat to approximately 30° to 32° F. throughout, slicing same into very thin slices, compressing the slices into a mass of desired shape, and freezing the mass.

4. The method of preparing fresh meat, comprising: subjecting the meat to a temperature between approximately 18° to 25° F., depending on its fatty consistency, for a period of approximately 48 hours, then thawing the meat to approximately 30° to 32° F. for approximately 12 hours, and then slicing same into very thin slices.

5. The method of preparing fresh meat comprising: compressing together separate pieces of fresh meat, subjecting the meat to a temperature between approximately 18° to 25° F., depending upon its fatty content, for a period of approximately 48 hours, then thawing the meat to approximately 30° to 32° F. for approximately 12 hours, slicing same into very thin slices, compressing the slices into a desired shape, and then freezing the mass into a loaf.

6. The method of preparing fresh meat comprising: freezing the entire mass of fresh meat, including the central part thereof, then thawing the meat for a relatively long interval, to wit, a number of hours, until the entire mass thereof has been raised to a substantially non-frozen condition throughout, to wit, to approximately 30° to 32° F., and then slicing the meat into very thin slices of approximately the thickness of "chipped" beef.

WILLIAM J. DUBIL.